(12) United States Patent
Fial et al.

(10) Patent No.: US 6,768,228 B1
(45) Date of Patent: Jul. 27, 2004

(54) AC POWER PROTECTION UNIT

(75) Inventors: Ronald A. Fial, Portland, OR (US); William Middleton Sheppard, Portland, OR (US)

(73) Assignee: AT&T Corp., New York, NY (US)

( * ) Notice: Subject to any disclaimer, the term of this patent is extended or adjusted under 35 U.S.C. 154(b) by 559 days.

(21) Appl. No.: 09/765,166

(22) Filed: Jan. 18, 2001

(51) Int. Cl.[7] .................................................. H02H 3/08
(52) U.S. Cl. ........................................ 307/131; 323/277
(58) Field of Search ............................... 361/93.1, 43.2, 361/43.7, 43.9, 78, 79, 91.1, 91.2, 90; 307/52, 131; 323/274, 275–277

(56) References Cited

U.S. PATENT DOCUMENTS

| | | | |
|---|---|---|---|
| 3,982,173 A | * 9/1976 | Berry et al. ................. | 323/236 |
| 4,626,954 A | * 12/1986 | Damiano et al. .............. | 361/96 |
| 5,914,545 A | 6/1999 | Pollersbeck ................. | 307/131 |

* cited by examiner

*Primary Examiner*—Ronald Leja

(57) ABSTRACT

A device is disclosed to determine when a resistive load is connected to a source of alternating current ("AC") power. The device includes a signal path and an AC power path. The device also includes a processor connected to a sensing circuit for determining a current level in the AC power path. The processor indicates an off condition according to the current level. The device also includes a power switch for turning off the AC power when instructed by the processor during the off condition.

6 Claims, 5 Drawing Sheets

AC POWER PROTECTION UNIT

TECHNICAL FIELD

The present invention relates to alternating current ("AC") power supplies, in general. More particularly, the present invention relates to the supply of AC power from a cable television ("CATV") system into the home, and detecting a resistive load connected to the AC power source.

Known power delivery systems use ground fault interrupters ("GFIs") that turn off electrical power when they sense an unbalance in the current flow between the hot and neutral wires that deliver AC electrical power. GFIs may be able to sense if a person or animal is touching the hot and neutral wires, thereby completing the circuit. GFIs, however, are not applicable in situations where the hot and neutral wires do not carry equal currents, such as CATV cables, because another return, namely ground, exists between the neutral-connection-to-the-load and the source of the AC power.

Power to loads can be turned on and off by switching circuit systems such as field effect transistors ("FETs"), silicon controlled rectifiers ("SCRs"), triacs, bipolar transistors, or relays. When FETs are used for switching circuits, complex level-shifting circuits or optical isolators are needed to properly drive the gate terminals of the FETs. FETs, however, are desirable for switching applications because switching AC power on and off using semiconductor junction-based devices, such as SCRs, triacs, bipolar transistors, generates electromagnetic interference and cross-over distortion, is less efficient and requires more drive power than FETs. Relays are slower than FETs and require increased drive power.

Known switching circuits use two FETs in series with their sources connected together. It may be difficult, however, to properly control the gates of the two FETs by biasing them with the proper voltages. This problem occurs because the FETs contain intrinsic diodes. During an off condition, the AC voltage passing through the intrinsic diodes causes the common source connections to swing widely in voltage, which can damage the gate drive circuits.

SUMMARY OF THE INVENTION

The present invention is directed to a method and a device to determine when a resistive load is connected to a source of AC power and shuts off power when a resistive load is detected. The device includes a signal path and an AC power path. The device also includes a microcontroller connected to a sensing circuit for determining an AC current level in the AC power path. The microcontroller indicates an off condition according to the current level. The device also includes a power switch for turning off the AC power when instructed by the microcontroller.

DETAILED DESCRIPTION OF THE PREFERRED EMBODIMENTS

An embodiment of the present invention is directed to a protective device, such as a power protection unit, that determines whether a resistive load, such as a person's body, is connected to an AC power source that should have only an electronic device as a load. Known electronic devices use some sort of rectifier-capacitor arrangement at their power supply inputs. Such electronic devices draw no current during a small portion of the AC cycle near the zero-voltage crossing points. A resistive load, however, draws current at all times except exactly at the AC power zero-voltage crossings. A human touching a high voltage AC wire will present a resistive load. An embodiment of the present invention samples the current at times that there should be no current, and if current is detected, it indicates that an unwanted current path exists. An embodiment of the present invention then can turn to an "off" state, thereby ending the fault condition. Response time may be less than one cycle.

An embodiment of the present invention operates by using a microcontroller that determines the position in time of each zero crossing of the AC power. A sense resistor is used to sense current flow. The voltage from the sense resistor is level shifted, amplified, and then converted to a digital value by the microcontroller. The microcontroller watches for current flow near the zero crossing, when the AC voltage is too low to forward bias the power input rectifiers in the electronic equipment expected as the load. If current is detected during this time, a resistive load is determined to be present. The microcontroller is programmed to shut off the power at once under this condition as the resistive load may be a human or an animal.

An embodiment of the present invention senses inappropriate or dangerous current flow in AC power delivery systems. An embodiment of the present invention may be used in situations where it is known that the load, or device to be powered, is electronic equipment. Known modern electronic equipment uses rectifiers and capacitors as part of its power-input circuit. Other systems that deliver power, such as CATV systems, have very specific electronic devices as loads. Electronic loads in a CATV system have a real ground path back to the power source, as well as the cable shield. Current in the cable feed to a house can be out of balance with the center conductor even in normal conditions. Thus, a system like a GFI is of no help.

Figure 1:
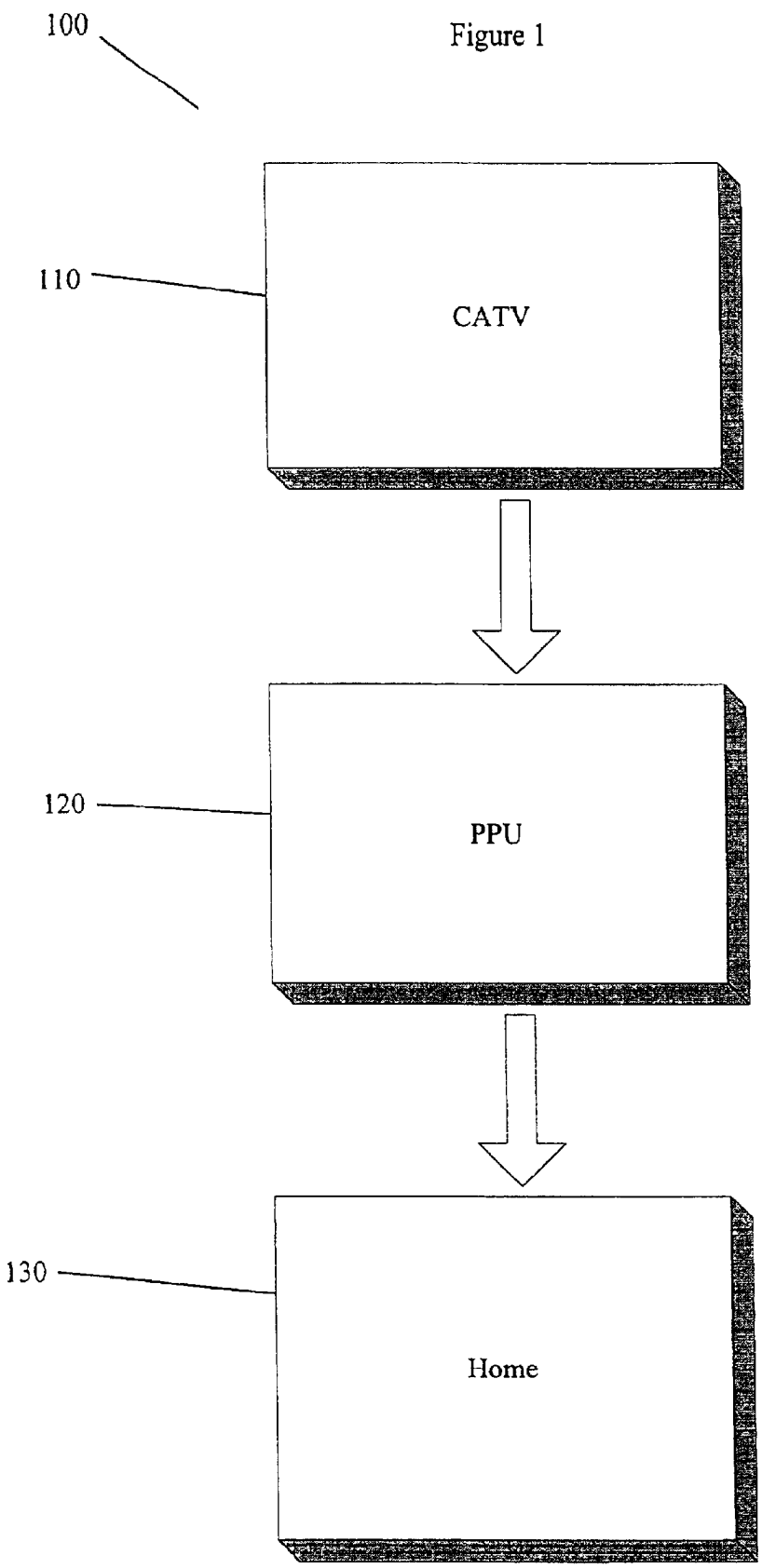
FIG. 1 illustrates a television signal delivery system in accordance with one embodiment of the present invention.

FIG. 1 depicts a television signal delivery system 100 in accordance with one embodiment of the present invention. System 100 may be any system that delivers signals to a location along with AC power. For example, system 100 may deliver CATV signals to a subscriber. CATV system 110 delivers the television signals and AC power to home location 130. Home location 130 may be a subscribers house or apartment. Preferably, CATV system 110 delivers the signals and AC power by a coaxial cable (not shown) into home 130.

System 100 also includes a Power Protection Unit ("PPU") 120 that controls the delivery of AC power from CATV system 110 to home location 130. PPU 120 is designed to protect the cable system equipment and the customer's wiring from excessive current flow. PPU 120 also can prevent electrical shock by shutting off power when it detects current flow to a pure resistive load, such as a human, even while a network interface unit ("NIU") is connected. When a fault is detected, the PPU 120 shuts off power to the home location 130 for a shutdown interval of about 10 to 18 seconds. The actual number of seconds may be determined by a random number generated by a microcontroller within PPU 120. After the shut-down interval, the PPU 120 attempts to restore power, and will repeatedly shut down until the fault is removed. The CATV signal always passes through the PPU 120 without interruption.

PPU 120 of the present invention may be installed on the telephone pole or CATV distribution box in series with the line from CATV system 110 that drops to home location 130. PPU 120 should meet safety requirements when it is desired to send AC power in the coaxial drop to home location 130, in order to power a cable modem or cable telephone equipment.

PPU 120 has an input connector and an output connector. PPU 120 requires that the AC power be present on the input F connector. The AC voltage should be between about 38 Volts and 90 Volts for proper functioning. PPU 120 may function in the following manner. When the PPU 120 is initially energized, the AC power is disconnected from the output F connector. Whenever the AC output is turned off for any reason, the shut-down timer is counted down, and then the power is turned on. If the current exceeds 2 amperes at any time, the power is turned off within 10 microseconds, and the shut-down timing is started. If the current exceeds 1.5 amps but is less than 2 amps, the output is turned off within a half cycle (at the next zero crossing), and the shut-down timing is started.

The NIU draws more than 0.5 amps peak for the first four AC half-cycles. When the output is turned on, if one of the first four half-cycles is less than 0.5 amps peak, the output is turned off within a half-cycle, and the shut-down timing is started. Otherwise, if current peaks are less than 40 mA for ¼ second (i.e., the NIU has been removed), the output is turned off and the shut-down timing is started. If a resistive load that draws 4 mA or greater of current is applied for six cycles, the output is turned off and the shut-down timing is started. For example, if a 15 kilo-ohm resistor is connected across the output while the output is on, the output will turn off.

The NIU must be connected and operating for this test; otherwise there is no output voltage. To limit RFI, the AC output is turned on only at a zero crossing. The output is turned off only at a zero crossing except in the case of current in excess of 2 amps, when it is turned off immediately instead of waiting for a zero crossing.

Figure 2:
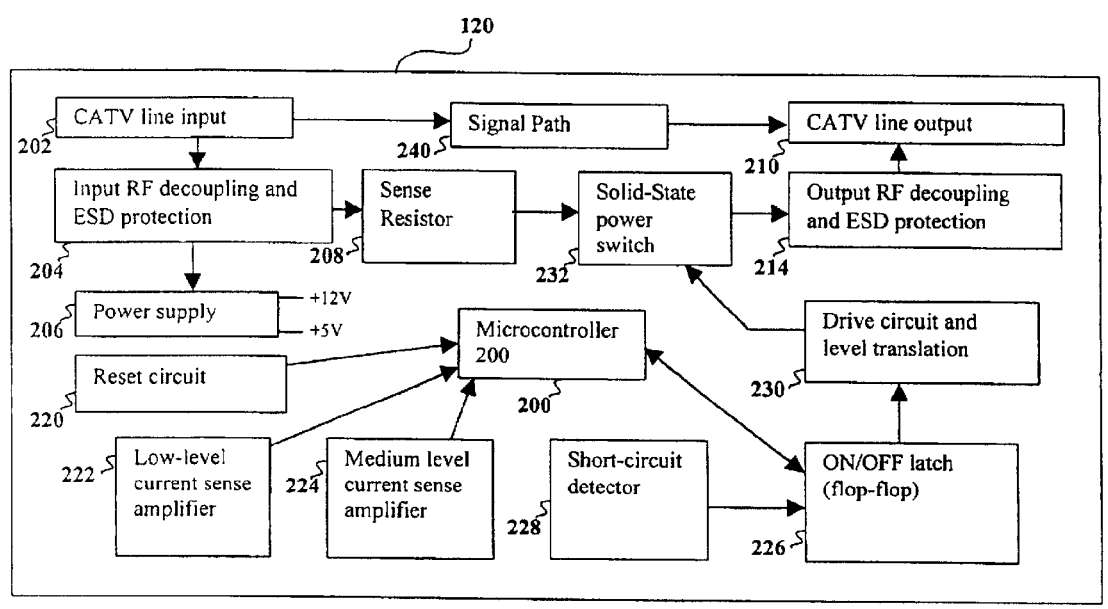
FIG. 2 illustrates a block diagram of a power protection unit for controlling delivery of alternating current power in accordance with an embodiment of the present invention.

FIG. 2 depicts a PPU 120 for controlling delivery of AC power in accordance with an embodiment of the present invention. PPU 120 receives a signal and AC power from CATV 110 through input 202. The signal passes to output 210 via signal path 240. The AC power passes to output 210 via input signal decoupling 204, sense resistor 208, power switch 232, and output signal decoupling 214. Output 210 then transmits the signal and AC power to home location 130. A microcontroller 200 controls the AC power to the home location 130 using the solid-state power switch 232. The microcontroller 200 is a processor. Preferably, the microcontroller 200 contains a multi-channel 8-bit analog-to-digital (A/D) converter. The microcontroller 200 also detects the zero crossing point for each cycle of the applied power. By measuring current flow at various points on each cycle, the microcontroller 200 can detect fault conditions and shut off the AC power to output 210. A power supply 206 provides a regulated 12 volts for an output latch 226 and solid-state switch 232, and a regulated 5 volts for the microcontroller 200 and amplifier 222.

The low-level current sense amplifier 222 utilizes an operational amplifier to sense currents in the milliampere range. This capability is used with special software to detect non-NIU current flow, such as a human. An ON/OFF latch 226 controls the solid state power switch 232, and other circuits turn the power on or off by controlling the state of on/off latch 226.

A short-circuit detector 228 removes power quickly if the current flow exceeds two amperes. Short-circuit detector 228 acts independently of the microcontroller 200. This makes the PPU 120 immune to output short-circuits. A medium-level current sense input 224 is used by the microcontroller 200 to recognize the characteristic temporal current pattern of the NIU. If the load does not look like an NIU, then the output power is shut down. When the NIU is not connected to the system, the power is never turned on for more than a half-cycle at a time. PPU 120 also includes reset circuit 220.

Thus, according to the embodiment depicted in FIG. 2, microcontroller 200 is coupled to power switch 232 through ON/OFF latch 226 and drive circuit 230 in order to control AC power to output 210. Microcontroller 200 senses current flow through sense resistor 208 at set intervals to determine if a resistive load has been placed on the line. Preferably, microcontroller 200 senses current near the zero crossings of the AC power. Near zero crossings, the AC voltage is too low to forward bias the power input rectifiers in the electronic equipment expected as the load. Low-level current sense amplifier 222 helps sense the voltage over a resistor and amplify it to be sensed by microcontroller 200. Microcontroller 200 converts the sensed value to a digital value. The digital value indicates the amount of AC current flowing through the sense resistor 208 and to output 210.

If no current is sensed by microcontroller 200 near the AC line zero crossings, no resistive load is on the line to home location 130 from CATV 110. Only the electronic equipment hooked to system 100 is on the load. If a current is sensed by microcontroller 200 near the AC zero crossings, then a resistive load is on the line, and AC power should be stopped. Microcontroller 200 prevents the delivery of AC power by signaling the output latch 226, which turns off the solid-state power switch 232. Solid-state power switch 232 prevents the AC power from flowing to output 210. Microcontroller 200 then waits for the shut-down interval, and signals the output latch 226 to turn on solid-state power switch 232. Further, microcontroller 200 turns the AC power on and off via output latch 226 and solid-state power switch 232 if faults are detected, such as excessive or too little current, and the case of a human or animal touching the line.

Figure 3:
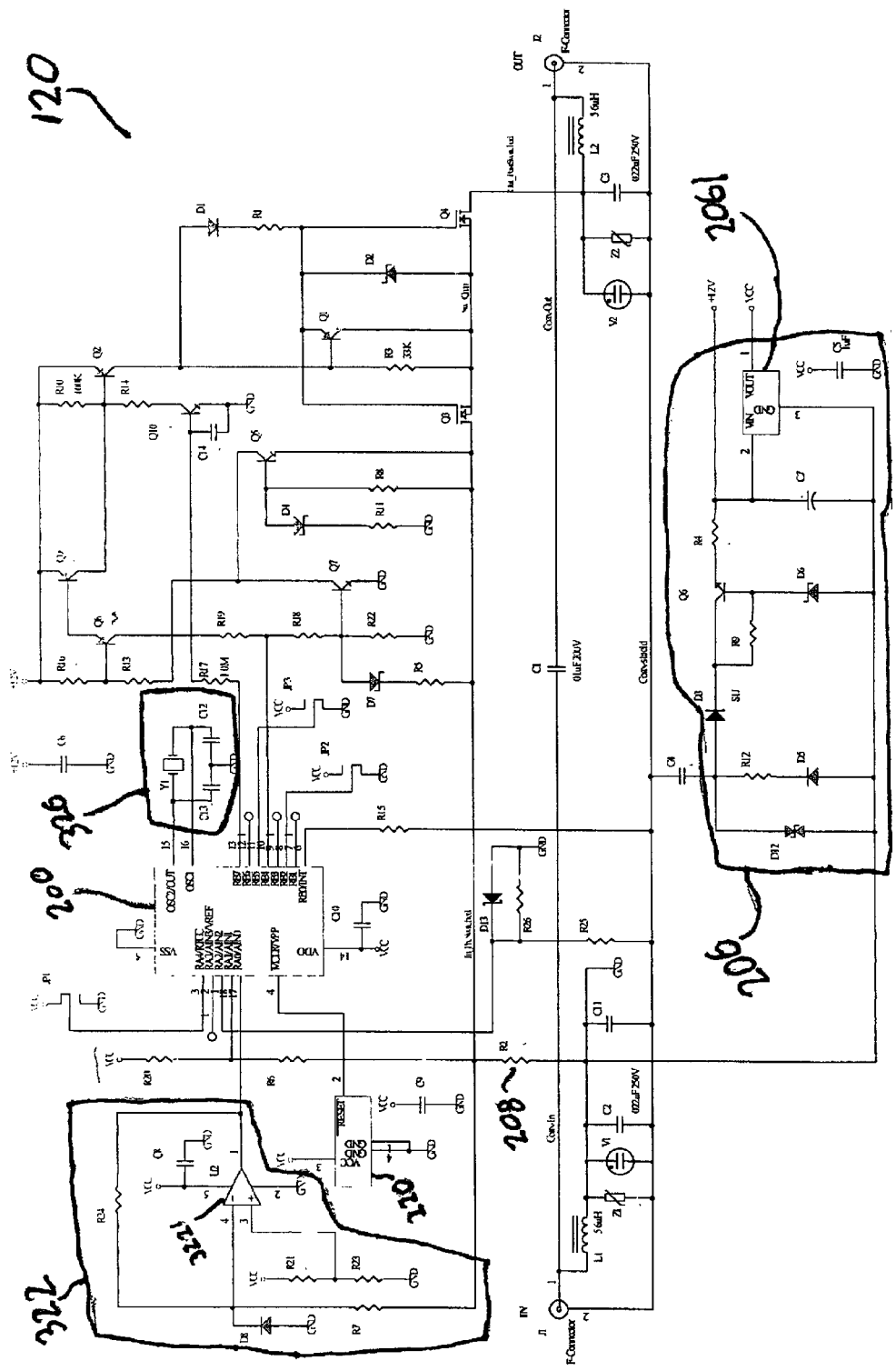
FIG. 3 illustrates a circuit diagram of a power protection unit in accordance with an embodiment of the present invention.

FIG. 3 depicts a schematic of PPU 120. Where applicable, the circuits correlating to the functional blocks depicted in FIG. 2 are indicated. Microcontroller 200 is depicted as a processor having A/D conversion capabilities. Microcontroller 200 has input pins and output pins that receive input and control other circuits. Though the described embodiment discloses a microcontroller, other logic devices, such as a logic gate array, Application Specific Integrated Circuits, or Field Programmable Gate Arrays and the like, may be used to perform the functions of microcontroller 200.

The signal path 240 is depicted as indicated by the circuit schematic. The CATV signal travels from an input F connector J1, through C1, to the output F connector J2, regardless of the state of microcontroller 200. J1 and J2 are F connectors designed for interfacing to circuit boards. J1 correlates to input 202 and J2 correlates to output 210, in FIG. 2. The path between J1 and J2 is a 75-ohm impedance microstripline. Capacitor C1 allows only signals to pass directly between the connectors J1 and J2.

Preferably, the AC power operates at 60 Hz. The AC power also may operate at other frequencies. The AC power is isolated from the signal by RF chokes, inductors L1 and L2, and bypass capacitors C2 and C3. When FETs Q3 and Q4 are conducting, the path of the AC power is from the input connector J1, through L1, current sampling resistor R2, Q3, Q4, and L2, to the output connector J2.

Preferably, Q3 and Q4 are power FETs having built-in parasitic diodes between their source and drain terminals. The manufacture of FETs may result in parasitic diodes being created from source to drain. In typical applications, the diodes are reversed-biased when powered. In the PPU 120, the voltage across FETs Q3 and Q4 is reversed and the parasitic diodes conduct and are taken into account. When Q3 is turned on, the parasitic diode in Q4 completes the current path. Likewise, when Q4 is turned on, the parasitic diode in Q3 complets the current path. This relationship permits Q3 and Q4 to operate as an AC switch without the need for additional diodes across the FETs. When both FETs are off, the parasitic diodes block in opposite directions, preventing current flow.

The inductors L1 and L2 and the capacitors C2 and C3 also attenuate noise generated by the microcontroller 200, keeping it from reaching connector J1 or J2. MOV Surge suppressors Z1 and Z2 prevent electrostatic discharge (ESD) on either J1 or J2 from damaging the unit. Gas discharge tubes V1 and V2 also aid in suppressing ESD pulses arriving at J1 or J2. Preferably, L1 and L2 have inductances of 5.6 $\mu$H. Preferably, C2 and C3 have capacitances of 0.022 $\mu$F.

The voltage across resistor R2 is an image of the current in the load. It is centered around zero. Preferably, R1 is 1 ohm. That voltage is fed to resistor R7, which is the input resistor of the inverting amplifier circuit 322 having amplifier 3221. Resistors R7 and R24 set the gain of amplifier circuit 322 at 20. Preferably, resistor R7 is 10K ohms and resistor R24 is 200K ohms. Resistors R21 and R23 divide the 5 volt supply, giving 0.125 volts at the non-inverting input, pin 3, of amplifier circuit 322. Preferably, R21 is 392K ohms and R23 is 10K ohms. This configuration sets amplifier circuit 322's output voltage at 2.5 volts, or half the supply, for zero load current, and centers the output at pin 1 in the usable range. The output at pin 1 is connected to pin 17 of the microcontroller 200 that is configured as an A/D analog input. Diode D8 prevents polarity inversion for a large negative input voltage. Capacitor C8 is a power supply bypass capacitor. Preferably, C8 has a capacitance of 0.1 $\mu$F.

The amplified signal is used in the detection of a resistive load, by examining the current shortly after zero crossings. With a regular electronic load, such as the NIU, the current after a zero crossing is near zero until the input voltage rises above the value stored on the NIU's power supply filter capacitor, allowing the NIU's rectifying diodes to turn on. However, a resistive load, such as a human contacting the drop line, will draw current as soon as the voltage rises above zero.

The current sense voltage across resistor R2 is applied to a voltage divider comprising resistors R6 and R20. Preferably, resistor R6 is 15K ohms and resistor R20 is 33.2K ohms. Thus, approximately two-thirds of the current sense voltage is applied to pin 18 of the microcontroller 200, along with enough DC to put the signal into the usable A/D converter range. Pin 18 is configured to be an AND analog input. This unamplified signal is used for all load current measurements, except resistive load and current in excess of 2 amps.

The AC line voltage is applied through resistor R15 to pin 6 of the microcontroller 200. Preferably, resistor R15 is 1M ohm. The input protection diodes of microcontroller 200 limit the range of the voltage at pin 6 to approximately 0 to 5 volts. This signal is used to start timing at the AC power's positive-going zero crossing of the line's center conductor relative to the shield. This allows the waveform of the load current to be examined at known points in the AC cycle.

The AC line voltage also is applied through resistive divider R25 and R26 to pin 1 of the microcontroller 200. Preferably, R25 is 681K ohms and R26 is 15K ohms. This pin is configured for analog to digital conversion. The voltage at pin 1 is used to measure the positive cycles of the applied line voltage. Diode D13 keeps the voltage at pin 1 from becoming negative.

Crystal Y1 and capacitors C12 and C13 act with microcontroller 200 to make a clock oscillator 326. Preferably, the clock oscillator 326 operates at 100K Hz and capacitors C12 and C13 have a capacitance of 47 pF. The low frequency of clock oscillator 326 results in low power usage and low RF noise generation.

Reset circuit 220 is a supervisory integrated circuit which assures that the microcontroller 200 is reset and turns on correctly, especially after a brown-out or erratic application of power.

Pin 10 of microcontroller 200 is configured as an input, so that microcontroller 200 can check the state of output latch 226 (FIG. 2).

If the output latch 226 is found in the off condition due to the action of the overcurrent sensors, the microcontroller 200 will wait for the shut-down interval, and then it will configure pin 10 as an output and set the voltage low for 40 microseconds to reset the output latch 226 and turn on the power to the load. Whenever the microcontroller 200 decides to turn the output on or off, it configures pin 10 as an output and applies a 40 microsecond pulse of appropriate polarity to the output latch 226. Then, microcontroller 200 configures pin 10 as an input again. Therefore, pin 10 has three states: floating, as in input to the microcontroller 200; connected to ground for 40 microseconds; and connected to +5 Volts for 40 microseconds.

PPU 120 also includes overcurrent sensing transistors Q5 and Q7. An output current in excess of 2 amps will turn on transistor Q7, if positive, or transistor Q5, if negative. Thus, overcurrent sensing transistors help form a short-circuit detector circuit corresponding to circuit 228 of FIG. 2. If either turns on, the voltage at the collectors will drop, turning on transistor Q8 and thus setting the output latch 226. The voltage across resistor R2 is applied to the positive overcurrent sensor at resistor R5. Preferably, resistor R5 is 4.7K ohms. The 1.22 volt reference diode D7 and the forward voltage drop of transistor Q7, along with a small drop in resistor R5, set the turn-on voltage of transistor Q7 at approximately 2 volts, which represents a line current of 2 amperes. The current through resistor R22 assures that the reference diode will reach its reference voltage. Preferably, resistor R22 is 10K ohms. Once transistor Q7 turns on, it is latched on, and power to the load is removed.

The negative overcurrent sensor is a similar circuit, consisting of transistor Q5, diode D4, and resistors R11 and R8. Preferably, resistor R11 is 4.7K ohms and resistor R8 is 10K ohms. A voltage of minus 2 volts across resistor R2 turns on transistor Q5, which triggers the transistors Q7–Q8 latch and removes power from the load.

Output latch 226 is a flip-flop made up of transistors Q7 and Q8 and resistors R13, R16, R18, R19, and R22. Preferably, resistor R13 is p100K ohms, resistor R16 is 47K ohms, resistor R18 is 33K ohms, resistor R19 is 47K ohms, and resistor R22 is 10K ohms. When an overcurrent sensor transistor Q5 or Q7 conducts and lowers its collector voltage, part of the voltage drop is applied to the base of transistor Q8. This turns on transistor Q8, which turns on transistor Q7 through resistors R19 and R18. Transistors Q7 and Q8 remain conducting until turned off by microcontroller 200. The output latch 226 can also be turned on by a positive voltage applied by microcontroller 200.

Power to the output F connector J2 passes through FETs Q3 and Q4. The power is interrupted by turning off FETs Q3 and Q4. This interruption is done by turning off high-voltage transistor Q2 in response to a signal from pin 10 of microcontroller 200 or from one of the overcurrent sensors, transistors Q5 and Q7. When power is first applied to PPU 120, pin 13 of microcontroller 200 is floating, so transistor Q10 is off, transistor Q2 is off, and therefore FET switches Q3 and Q4 are off. At initial startup, microcontroller 200 sets the transistors Q7–Q8 latch on, which prevents transistor Q2 from turning on, before it turns on transistor Q10. This assures that the power output is initially off. Capacitor C14 reduces the effect of noise on transistor Q10. Preferably, capacitor C14 has a capacitance of 0.01 μF.

When transistor Q10 is on, the output is controlled by the output latch 226. If latch transistor Q8 is on, transistor Q9 is also on and keeps transistor Q2 off. When transistors QB and Q9 are off, transistor Q2 is held on by current through resistor R14 and transistor Q10. Preferably, R14 is 47K ohms. Transistor Q2 controls the output FETs, Q3 and Q4. When transistor Q2 is on, the gates of the FETs Q3 and Q4 are made positive relative to their source terminals through transistor Q2, diode D1, and resistor R1, so the FETs are conducting and the output AC is being delivered. Zener diode D2 ensures that the gate-to-source voltage of the FETs never exceeds 13 volts. Resistor R1 limits the current through diode D2. Preferably, R1 is 47K ohms. When transistor Q2 is off, transistor Q2's collector voltage may swing to 90 volts relative to transistor Q2's emitter, because of conduction through transistor Q4's internal diode. Therefore, transistor Q2 is a high-voltage PNP transistor.

When transistor Q2 switches off, transistor Q1 is turned on by current through resistor R3. Preferably, R3 is 33K ohms. Transistor Q1 quickly discharges the gates of the FETs Q3 and Q4 for fast turn-off. Diode D1 is necessary, acting as a switch to disconnect transistor Q1's base from resistor R1 at the instant of turn-off, so transistor Q1 can turn on fully. Without transistor Q1, the FETs Q3 and Q4 may not turn off quickly enough when a short-circuit is detected, especially under extremely cold conditions.

The power to run the power supply circuit 206 is derived relative to the CATV cable's center conductor instead of the shield. That is, the center conductor of the coax line is used as the common reference for the circuit. To prevent polarizing currents which could cause corrosion of connectors, only AC is taken from the line, through capacitor C4.

Capacitor C4 feeds a half-wave rectifier comprising diodes D3 and D5. Preferably, C4 has a capacitance of 1 μF. This rectifier feeds rectified voltage to the 12 volt regulator consisting of transistor Q6, resistor R9 and diode D6. Preferably, R9 is 100K ohms. Resistors R12 and R4 help distribute current draw over the cycle. Preferably, R12 is 8.2K ohms and R4 is 150 ohms. Capacitor C7 filters the 12 volt supply. Preferably, C7 has a capacitance of 33 μF. Notice that there is no filter capacitor between the cathode of diode D3 and ground. Placing the capacitor after the regulator transistor allows the use of a low-voltage capacitor, such as a tantalum capacitor. The usual capacitor-charging current spike at power-on is greatly reduced in this arrangement, and a large capacitance high-voltage filter capacitor is not required.

Regulator 2061 is the 5 volt regulator. The regulator 2061 uses the +12 volt supply to provide 5 volts direct current ("DC") for the operation of the microcontroller 200. Thus, PPU 120 can sense inappropriate or dangerous current flow in AC power delivery systems.

Figure 4:
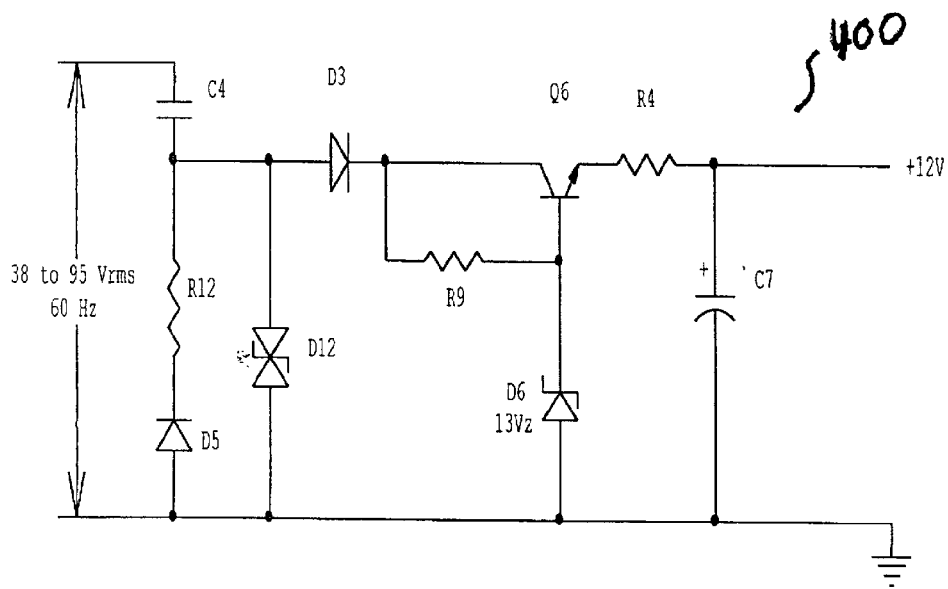
FIG. 4 illustrates a circuit diagram of an AC-powered power supply circuit in accordance with an embodiment of the present invention.

FIG. 4 depicts a schematic of an AC-powered power supply circuit 400 in accordance with another embodiment of the present invention. Power supply circuit 400 provides a rectified but unfiltered voltage that is fed to a voltage-regulating transistor and then filtered by a capacitor. The power supply circuit receives the AC voltage operating at about 60 Hz, and about 38 to 95 Vrms. Diodes D3 and D5 provide a rectified voltage to transistor Q6. Diode D6 limits the output of Q6 to approximately 12 volts when transistor Q6 is conducting. Capacitor C7 maintains the output voltage while transistor Q6 is not conducting. Preferably, capacitor C7 has a capacitance of 33 μF. Thus, according to the embodiment depicted in FIG. 4, the sequence of providing power is rectifier, regulator, and filter. Known power sources use a rectifier, filter and regulator sequence.

Diode D12 serves as a protective device within power supply circuit 400. Preferably, diode D12 is a dual Zener diode used as a transient voltage suppressor. If a large voltage spike occurs on the power line coupled to PPU 210, diode D12 limits the voltage across itself—and, therefore, the voltage across diode D3 and the rest of power supply circuit 400—to about 170 volts.

The sequence of power supply circuit 400 is more efficient than the known linear regulator sequence under those conditions when the input AC voltage is high, and the desired output voltage is low. For example, according to FIG. 4, the input AC voltage is 90 VAC, and the desired output voltage is 12 volts. Filtering after the regulator also allows the use of a lower voltage filter capacitor that is less expensive than a higher voltage capacitor. The power supply circuit 400 is appropriate where a small amount of power at low voltage is required from a high-voltage AC power source, and where a transformer or switching power supply is not feasible.

Figure 5:
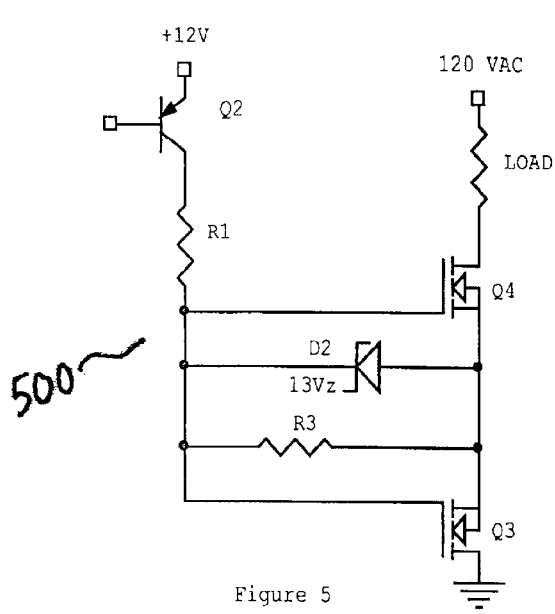
FIG. 5 illustrates a circuit diagram of a circuit to control AC power in accordance with an embodiment of the present invention.

FIG. 5 depicts a circuit 500 to control AC power to a load by turning on and off two enhancement mode FETs Q3 and Q4 according to another embodiment of the present invention. FETs Q3 and Q4 include parasitic diodes, as described above.

The resulting AC switch of circuit 500 can be controlled by a tiny amount of power. A single high-voltage transistor allows high voltage across the switch to be controlled by a low-voltage circuit connected to one end of the switch of circuit 500. Response time in circuit 500 is reasonably fast. As depicted in FIG. 5, circuit 500 has few parts and uses very little power.

Transistor Q2 controls the output of FETs Q3 and Q4. Preferably, Q2 is a high-voltage PNP transistor. When transistor Q2 is on, it applies 12 volts to the gates of FETs Q3 and Q4. By applying the voltage, transistor Q3 is turned on and brings the source at transistor Q4 to the same voltage as at the source of transistor Q3, which also turns on transistor Q4. According to FIG. 5, the following actions occur while transistor Q2 is on. During one half-cycle, transistor Q3 is turned on and the parasitic diode in transistor Q4 completes the circuit. During the other half-cycle, transistor Q4 is turned on and the parasitic diode in transistor Q3 completes the circuit. When transistor Q2 is off, resistor R3 pulls the gates of FETs Q3 and Q4 to the FETs' sources, and turns them off. Preferably, in this embodiment, resistor R3 has a resistance of 100K ohms.

Diode D2 ensures that the gate-to-source voltage of FETs Q3 and Q4 should not exceed 13 volts. Resistor R1 limits the current through diode D2. Preferably, R1 is 47K ohms.

Thus, the present invention achieves control of AC power using FETs with fewer, less expensive parts than known switching circuits. The present invention allows a reliable high-voltage AC power switch to operate that is simple to turn on and off. By using a high-voltage PNP transistor Q2, circuit 500 uses fewer and less expensive parts than previous circuits. Further, the present invention discloses a switch faster than optocouplers because of its direct connections to the AC power. Circuit 500 is useful particularly where an AC power load is controlled without distorting the AC waveform, without generating electromagnetic interference, and using a decreased amount of power.

Figure 6:
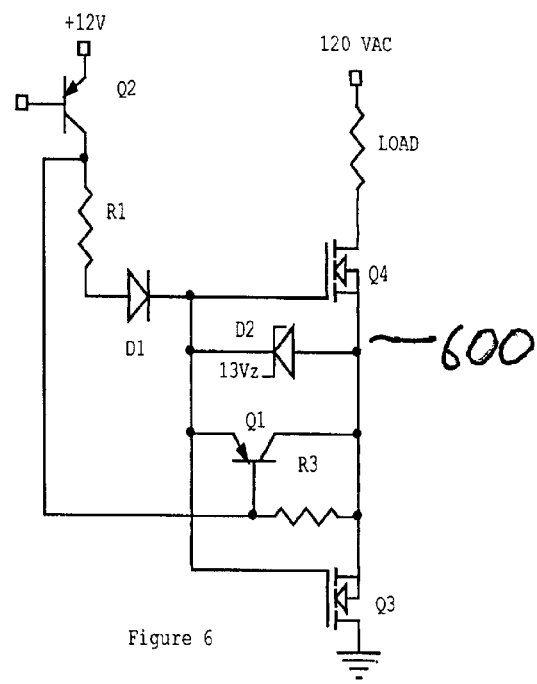
FIG. 6 illustrates a circuit diagram of a circuit to control AC power in accordance with another embodiment of the present invention.

FIG. 6 depicts another circuit 600 to control AC power to a load by turning on and off two enhancement mode FETs Q3 and Q4 according to another embodiment of the present invention. FETs Q3 and Q4 include parasitic diodes. A dual FET AC power switch implemented in this embodiment has faster turn-off action. Faster switching action may produce more efficient switch operation and may increase the reliability of fault shutdown circuits in temperature extremes.

Circuit 600 reduces the time needed to turn off in the case of excessive current flow. While transistor Q2 is at an on condition, during one half-cycle, FET Q3 is turned on and the parasitic diode in FET Q4 completes the circuit. During the other half-cycle, FET Q4 is turned on, and the parasitic diode in FET Q3 completes the circuit. To reduce the time needed to turn off, transistor Q1 discharges the voltage on the gates of FETs Q3 and Q4 when transistor Q2 turns off. The base drive of transistor Q1 is the voltage to be discharged. Thus, transistor Q1 conducts as long as there is a charge to discharge. During turn-off, diode D1 disconnects the base of transistor Q1 from R1 so that the majority of the FET gate voltage appears across R3, quickly turning on Q1. Thus, diode D1 may act as a switch to disconnect transistor Q1's base from its emitter. Preferably, in this embodiment, R1 is 47K ohms, and R3 is 33K ohms. Circuit 600 prevents slow turnoff that may cause damage or destroy FET devices in the case of excessive current flow.

Circuit 600 is an active turnoff circuit that uses transistor Q1 and associated parts to cause faster shutdown. This feature allows the FETs Q3 and Q4 to be used in situations where only single-ended unipolar drive is available or is desirable, and still achieves the speed of a bipolar drive. Without active turnoff circuit 600 and, particularly transistor Q1, it is possible to damage the FETs by shutting down under fault conditions, primarily at sub-zero temperatures. Active turnoff circuit 600 allows the switching circuit action to execute fast enough to survive faults at very low temperatures.

Figure 7:
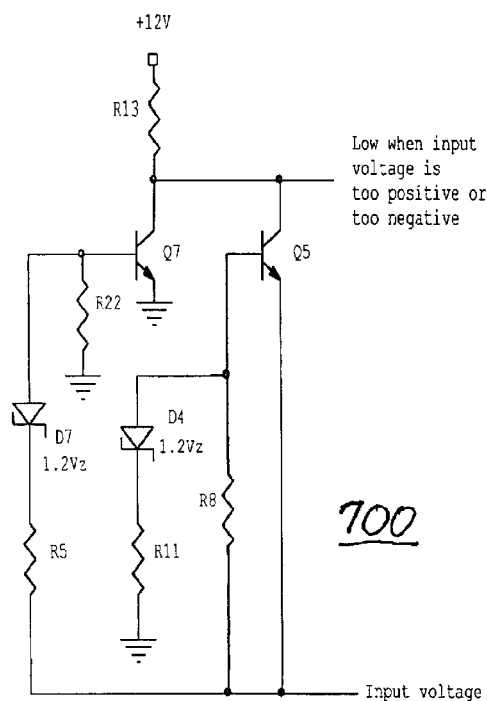
FIG. 7 illustrates a circuit diagram of a circuit that detects both positive and negative over-voltage in accordance with an embodiment of the present invention.

FIG. 7 depicts a circuit 700 that detects both positive and negative over-voltage according to an embodiment of the present invention. Circuit 700 uses a sense resistor (not shown) to detect the positive and negative over-current conditions. The load current flows through the sense resistor and develops a voltage that is the input voltage for circuit 700. Sensing voltage or current levels for exceeding positive and negative limits is useful in devices such as fault detectors, electronic circuit protectors, signal level detectors, and the like. The output of circuit 700 may be used to turn off the load voltage if load current is excessive. Transistor Q7 turns on if the input voltage is too high, or too positive. If the input voltage is too negative, transistor Q5 turns on and pulls down the output voltage. Either transistor Q5 or Q7 turning on should pull down the output voltage of circuit 700. The voltage references D4 and D7 provide accurate and stable sense settings. Preferably, voltage references D4 and D7 are set to 1.2 Volts. Circuit 700 is in contrast to known sensing methods that center on ground, require both positive and negative power supplies, level shifting circuits, or current mirrors.

Thus, circuit 700 achieves a symmetrical sensing of bipolar voltage levels directly. Circuit 700 operates with a reduced number of parts, and without the use of comparators or operational amplifiers, or without the use of dual voltage supplies.

Figure 8:
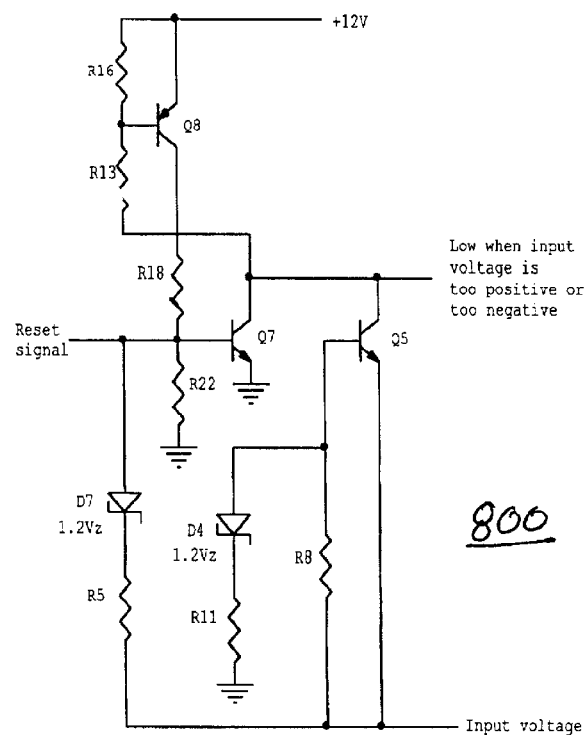
FIG. 8 illustrates a circuit diagram of a circuit that detects both positive and negative over-voltage in accordance with another embodiment of the present invention.

FIG. 8 depicts a circuit 800 that includes a latching feature added to the circuit 700 depicted in FIG. 7. Transistors Q7 and Q8 form a bi-stable latch, or flip-flop. If either transistor Q5 or Q7 turns on, the voltage at the collectors of transistors Q5 and Q7 will become low, which lowers the voltage at the base of transistor Q8 through resistor R13. Preferably, R13 is 100K ohms. The low condition turns on transistor Q8 and raises the voltage at the base of transistor Q7 through resistor R18. Preferably, resistor R18 is 80K ohms. Thus, if the input voltage becomes excessively high or excessively low, either transistor Q7 or transistor Q5 conducts, lowering the output voltage, and the Q8–Q7 latch will hold it low until the reset signal is driven low. The reset signal preferably is supplied by microcontroller 200. Because transistor Q7 is the positive over-voltage detector and part of the latch, it should not be necessary to add a fourth transistor to achieve the latching function in circuit 800.

Many modifications and other embodiments of the present invention will come to mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the following claims.

What is claimed is:

1. A device to determine a resistive load connected to a source of alternating current ("AC") power, comprising:

a. a signal path and an AC power path, both paths connected to a device input and a device output;

b. a processor connected to a sensing circuit including a sensing resistor that determines a current level in said AC power path, said processor indicating an off condition according to said current level on said sensing resistor;

c. a control circuit that turns off said AC power to said device output when instructed by said processor at said off condition, wherein said control circuit comprises a first field effect transistor and a second field effect transistor coupled to a transistor, said transistor coupled to the gates of said first and second field effect transistors; and d. a circuit to control AC power to a load, comprising:
  a1. a first resistor and an electronic switch connected in series to a source of direct current ("DC") power;
  b1. said first field effect transistor having a drain connected in series with said load and said AC power;
  c1. said second field effect transistor having a source connected in series with a source of said first field effect transistor, wherein the drain of said second field effect transistor is connected to ground;
  d1. a clamping diode having a cathode and an anode, wherein said cathode is connected to the gate of each of said first and second field effect transistors, and wherein the anode of said clamping diode is connected to the source of each of said first and second field effect transistors and to the end of said series connection of said electronic switch and said first resistor opposite to said DC power source; and
  e1. a second resistor connected in parallel to said clamping diode.

2. A circuit to control alternating current (AC) power to a load, comprising:
  a. a first resistor and an electronic switch connected in series to a source of direct current ("DC") power;
  b. a first FET transistor having a drain connected in series with said load and said AC power;
  c. a second FET transistor having a source connected in series with a source of said first FET transistor, wherein the drain of said second FET transistor is connected to ground;
  d. a clamping diode having a cathode and an anode, wherein said cathode is connected to the gate of each of said first and second FET transistors, and wherein the anode of said clamping diode is connected to the source of each of said first and second FET transistors and to the end of said series connection of said switch and said first resistor opposite to said DC power source; and
  e. a second resistor connected in parallel to said clamping diode.

3. The circuit of claim 2, wherein said clamping diode is a Zener diode having a breakdown voltage rating lower than the gate-to-source breakdown voltage of the said first and second FETS.

4. The circuit of claim 2, wherein said switch comprises a transistor.

5. The circuit of claim 4, wherein said transistor is a PNP transistor having an emitter connected to the DC power source and a collector connected to the first lead of said first resistor.

6. A circuit to sense positive and negative over-voltage, comprising:
  a. a first transistor connected to a sense resistor having a current;
  b. a second transistor connected to said sense resistor; and
  c. a first voltage reference connected to said first transistor and a second voltage reference connected to said second transistor, said voltage references providing a sense setting to said first and second transistors, wherein said first transistor is configured to have an on condition when said input voltage is above a first predetermined level as sensed by said current in said sense resistor, and said second transistor having an on condition when said input voltage is below a second predetermined level as sensed by said current in said sense resistor.

* * * * *